United States Patent
Mahinroosta et al.

(10) Patent No.: US 12,319,586 B2
(45) Date of Patent: Jun. 3, 2025

(54) CHEMICAL SYNTHESIS OF BOEHMITE

(71) Applicants: Mostafa Mahinroosta, Nazarabad (IR); Ali Allahverdi, Tehran (IR)

(72) Inventors: Mostafa Mahinroosta, Nazarabad (IR); Ali Allahverdi, Tehran (IR)

(73) Assignee: Iran University of Science and Technology (IR)

( * ) Notice: Subject to any disclaimer, the term of this patent is extended or adjusted under 35 U.S.C. 154(b) by 1080 days.

(21) Appl. No.: 17/207,622

(22) Filed: Mar. 20, 2021

(65) Prior Publication Data

US 2021/0300776 A1    Sep. 30, 2021

Related U.S. Application Data

(60) Provisional application No. 63/035,842, filed on Jun. 8, 2020.

(51) Int. Cl.
  C01F 7/60        (2006.01)
  C01F 7/34        (2006.01)
  C01F 7/441       (2022.01)

(52) U.S. Cl.
  CPC ............ *C01F 7/34* (2013.01); *C01F 7/441* (2013.01); *C01F 7/60* (2013.01)

(58) Field of Classification Search
  CPC ............ C01P 2006/14; C01P 2006/16; C01P 2006/17; C01P 2006/80; C01P 2006/12; C01P 2002/72; C01F 7/34; C01F 7/41; C01F 7/441; C01F 7/60
  See application file for complete search history.

(56) References Cited

PUBLICATIONS

Yasuhiro (JP 2018162172, see machine translation), published Oct. 2018.*
Wakabayashi (GB 2031394, see machine translation), published Apr. 1980.*

* cited by examiner

*Primary Examiner* — Smita S Patel

(57) ABSTRACT

A method for producing boehmite under atmospheric pressure may include producing a sodium aluminate solution by dissolving sodium aluminate in water. The method may further include producing an aluminum hydroxide gel by mixing a hydrochloric acid solution with the sodium aluminate solution. The method may further include producing an aluminum chloride solution by mixing a hydrochloric acid solution with the aluminum hydroxide gel. The method may further include producing saturated aluminum chloride solution by heating the aluminum chloride solution. The method may further include producing a boehmite gel by mixing an ammonia solution with the saturated aluminum chloride solution and heating the boehmite gel to produce boehmite.

20 Claims, 11 Drawing Sheets

300

400

900

1100

CHEMICAL SYNTHESIS OF BOEHMITE

CROSS-REFERENCE TO RELATED APPLICATION

This application claims the benefit of priority from U.S. Provisional Patent Application Ser. No. 63/035,842, filed on Jun. 8, 2020, and entitled "NON-SEEDED PRODUCTION PROCESS OF NANO-BOEHMITE," which is incorporated herein by reference in its entirety.

TECHNICAL FIELD

The present disclosure relates to boehmite and particularly relates to a method for chemical synthesis of nano boehmite.

BACKGROUND

Boehmite is an aluminum oxide hydroxide mineral with the formula of $\gamma$-AlO(OH). Boehmite is a component of bauxite, which is a sedimentary rock with high aluminum content. Boehmite is wildly used in ceramics, abrasives, fire retardants, adsorbents, catalysts, and composite fillers. Boehmite may be synthesized via various methods, such as hydrothermal methods at elevated temperatures and pressures, external seeding methods or hydrolysis of aluminum organic compounds, such as aluminum alkoxides. Boehmite may further be synthesized by neutralization of aqueous solutions of aluminum salts, such as aluminum chloride, aluminum sulfate, and aluminum nitrate by adding alkalis, such as sodium hydroxide, potassium hydroxide, and ammonia. Another approach for synthesizing boehmite may be neutralization of aluminum salts by blowing carbon dioxide gas into a reactor containing aluminum salts.

A hydrothermal method may produce the highest degree of boehmite precipitation, however, high temperatures and pressures may inhibit hydrothermal method usage in large-scale productions. Furthermore, hydrolysis of aluminum organic compounds may have a low production yield and high cost of reagents, such as aluminum alkoxides. Boehmite precipitation using external seeding may require aluminum hydroxide as an external seed and $NaHCO_3$, which may have low solubility in water. On the other hand, time-consuming filtration, large amounts of seed requirements, and low surface area of produced boehmite may also limit industrial usage of external seeding methods for boehmite production. In addition, these methods may lead to a high cost, and an additional step of reducing an average particle size of boehmite.

There is, therefore, a need for a cost-effective method to produce boehmite at room temperature and under room pressure. There is further a need for a method to produce boehmite with high surface area and purity.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for producing boehmite under atmospheric pressure. An exemplary method may include producing a sodium aluminate solution by dissolving sodium aluminate in water. An exemplary method may further include producing an aluminum hydroxide gel by mixing hydrochloric acid solution with an exemplary sodium aluminate solution. An exemplary method may further include producing an aluminum chloride solution by mixing a hydrochloric acid solution with an exemplary aluminum hydroxide gel. An exemplary method may further include producing a saturated aluminum chloride solution by heating an exemplary aluminum chloride solution. An exemplary method may further include producing a boehmite gel by mixing an ammonia solution with an exemplary saturated aluminum chloride solution and producing boehmite by heating an exemplary boehmite gel.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

Figure 1:
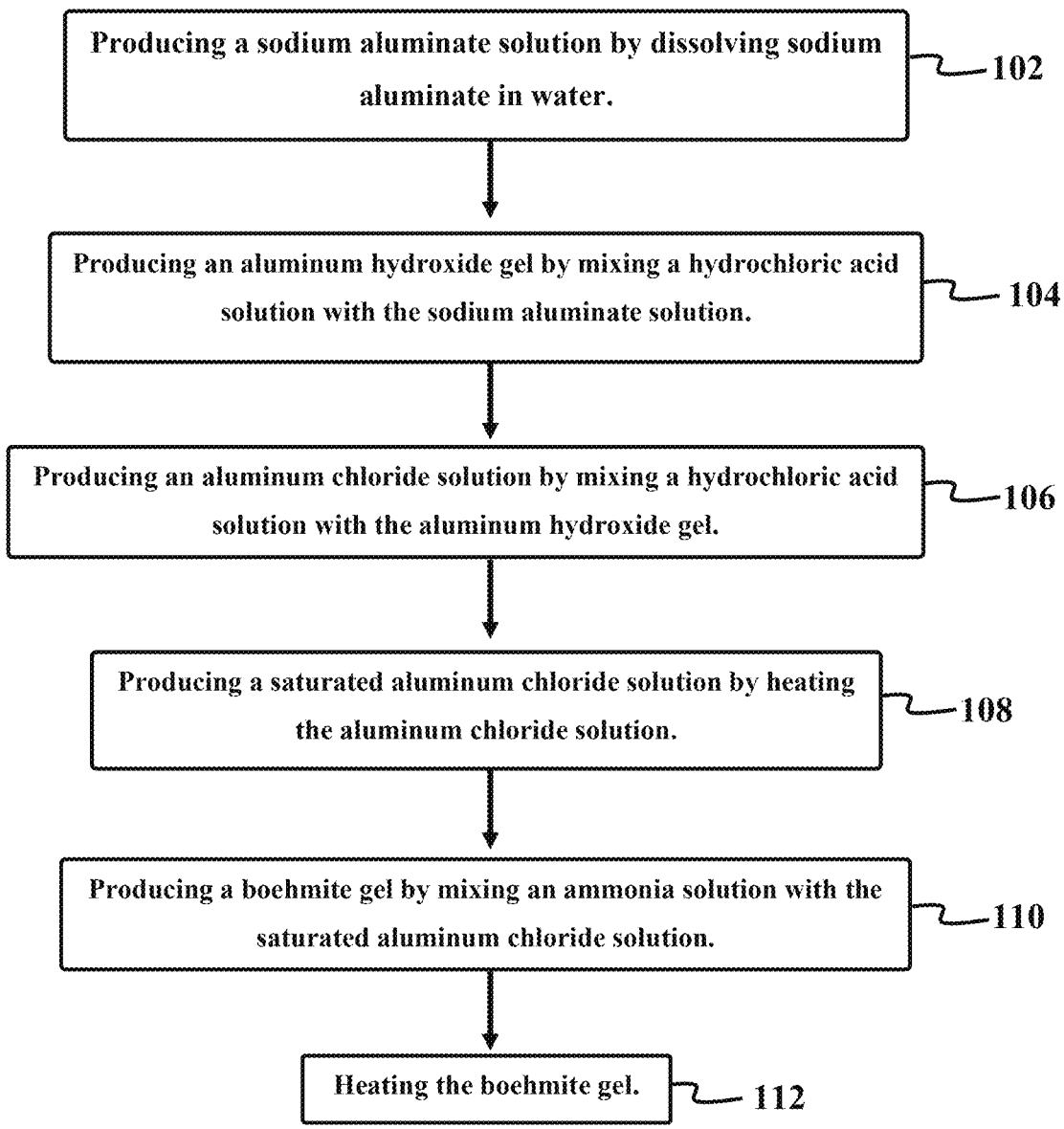
FIG. 1 illustrates a flowchart of a method for producing boehmite, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of a method for producing boehmite. A sodium aluminate solution may be produced by dissolving sodium aluminate in water. To produce an exemplary sodium aluminate solution, sodium aluminate and water may be mixed in a stirred reactor, where an exemplary stirred reactor may include a mixer and a heater element. An exemplary mixer may rotate with a rotational speed between 100 rpm and 300 rpm to dissolve sodium aluminate in water. Sodium aluminate may be obtained from red muds, slags, fly ashes, kaolin, and metakaolin.

Aluminum hydroxide gel may be produced by adding hydrochloric acid solution to an exemplary sodium aluminate solution. An exemplary mixer may be used to mix an exemplary hydrochloric acid and an exemplary sodium aluminate solution with a rotational speed between 100 rpm and 300 rpm. An exemplary aluminum hydroxide gel may include gibbsite and bayerite phases with the formulas of $\gamma$-Al(OH)$_3$ and $\alpha$-Al(OH)$_3$, respectively. To change the structural phases of an exemplary aluminum hydroxide gel from gibbsite and bayerite phases to a nordstrandite phase, an aging process may be performed on an exemplary aluminum hydroxide gel. As used herein, an exemplary aging process may refer to two simultaneously-occurring steps of mixing and creating turbulence in an exemplary aluminum hydroxide gel. In an exemplary embodiment, an exemplary aluminum hydroxide gel may be mixed utilizing an exemplary mixer with a rotational speed between 200 rpm and 700 rpm. In an exemplary embodiment, an exemplary turbulence may be created by circulating an exemplary aluminum hydroxide gel within a vessel utilizing a pump. An exemplary pump may pump out an exemplary aluminum hydroxide gel through a line and then inject the exemplary aluminum hydroxide gel back into an exemplary vessel through another line. In an exemplary embodiment, an exemplary aging process may inhibit agglomeration of an exemplary aluminum hydroxide gel. An exemplary aluminum hydroxide gel may be produced according to the following reaction:

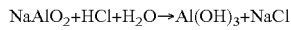

NaAlO$_2$+HCl+H$_2$O→Al(OH)$_3$+NaCl

NaCl may be a byproduct of the reaction between an exemplary hydrochloric acid solution and an exemplary sodium aluminate solution. An exemplary aluminum hydroxide gel may be washed with water to remove NaCl from the exemplary aluminum hydroxide gel. In an exemplary embodiment, washing an exemplary aluminum hydroxide gel may include mixing an exemplary aluminum hydroxide gel with water in an exemplary mixer with a rotational speed between 200 rpm and 700 rpm. An exemplary mixture of an exemplary aluminum hydroxide gel, NaCl, and water may be filtered to remove NaCl and water from an exemplary aluminum hydroxide gel.

An exemplary aluminum chloride solution may be obtained by mixing a hydrochloric acid solution with an exemplary aluminum hydroxide gel in an exemplary mixer with a rotational speed of between 100 rpm and 500 rpm.

After producing an exemplary aluminum chloride solution, the exemplary aluminum chloride solution may be heated at 50° C. to 95° C. to form a saturated or a supersaturated solution of an exemplary aluminum chloride solution. An exemplary aluminum chloride solution may be produced according to the following reactions:

$\alpha$-Al(OH)$_3$+3HCl→AlCi$_3$+3H$_2$O

$\gamma$-Al(OH)$_3$+3HCl→AlCi$_3$+3H$_2$O

To produce a boehmite gel and an ammonium chloride solution, an ammonia solution may be added to an exemplary saturated aluminum chloride solution. An exemplary ammonia solution may be added to an exemplary saturated aluminum chloride solution for 30 minutes to 60 minutes. An exemplary ammonia solution may be added to an exemplary saturated aluminum chloride solution while stirring the mixture. In an exemplary embodiment, an exemplary ammonia solution and an exemplary saturated aluminum chloride solution may be mixed in an exemplary mixer with a rotational speed of between 300 rpm and 700 rpm. An exemplary boehmite gel may be produced according to the following reaction:

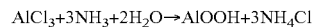

AlCl$_3$+3NH$_3$+2H$_2$O→AlOOH+3NH$_4$Cl

An exemplary boehmite gel may be separated from an aqueous phase by filtration, where an exemplary aqueous phase may include an exemplary ammonium chloride solution.

To separate an ammonium chloride salt from an exemplary ammonium chloride solution, an exemplary ammonium chloride solution may be heated at 80° C. and 100° C. for 2 hours to 5 hours. An exemplary boehmite gel may be heated at 140° C. and 220° C. for 4 to 6 hours to produce boehmite. Boehmite may be grinded in for example, a mill for 10 and 30 minutes to produce a boehmite powder.

FIG. 1 illustrates a flowchart of a method 100 for producing boehmite, consistent with one or more exemplary embodiments of the present disclosure. In an exemplary embodiment, method 100 may include a step 102 of producing a sodium aluminate solution by dissolving sodium aluminate in water, a step 104 of producing an aluminum hydroxide gel by mixing a hydrochloric acid solution with the sodium aluminate solution, a step 106 of producing an aluminum chloride solution by mixing a hydrochloric acid solution with the aluminum hydroxide gel, a step 108 of producing a saturated aluminum chloride solution by heating the aluminum chloride solution, a step 110 of producing a boehmite gel by mixing an ammonia solution with the saturated aluminum chloride solution, and a step 112 of heating the boehmite gel to produce boehmite.

In an exemplary embodiment, step 102 of producing the sodium aluminate solution may include adding sodium aluminate with a purity between 80 wt. % and 99 wt. % to water to reach a concentration between 1 mol/L and 5 mol/L. Dissolving sodium aluminate in water is an exothermic reaction and may increase the temperature by 10° C. to 20° C.

Figure 2:
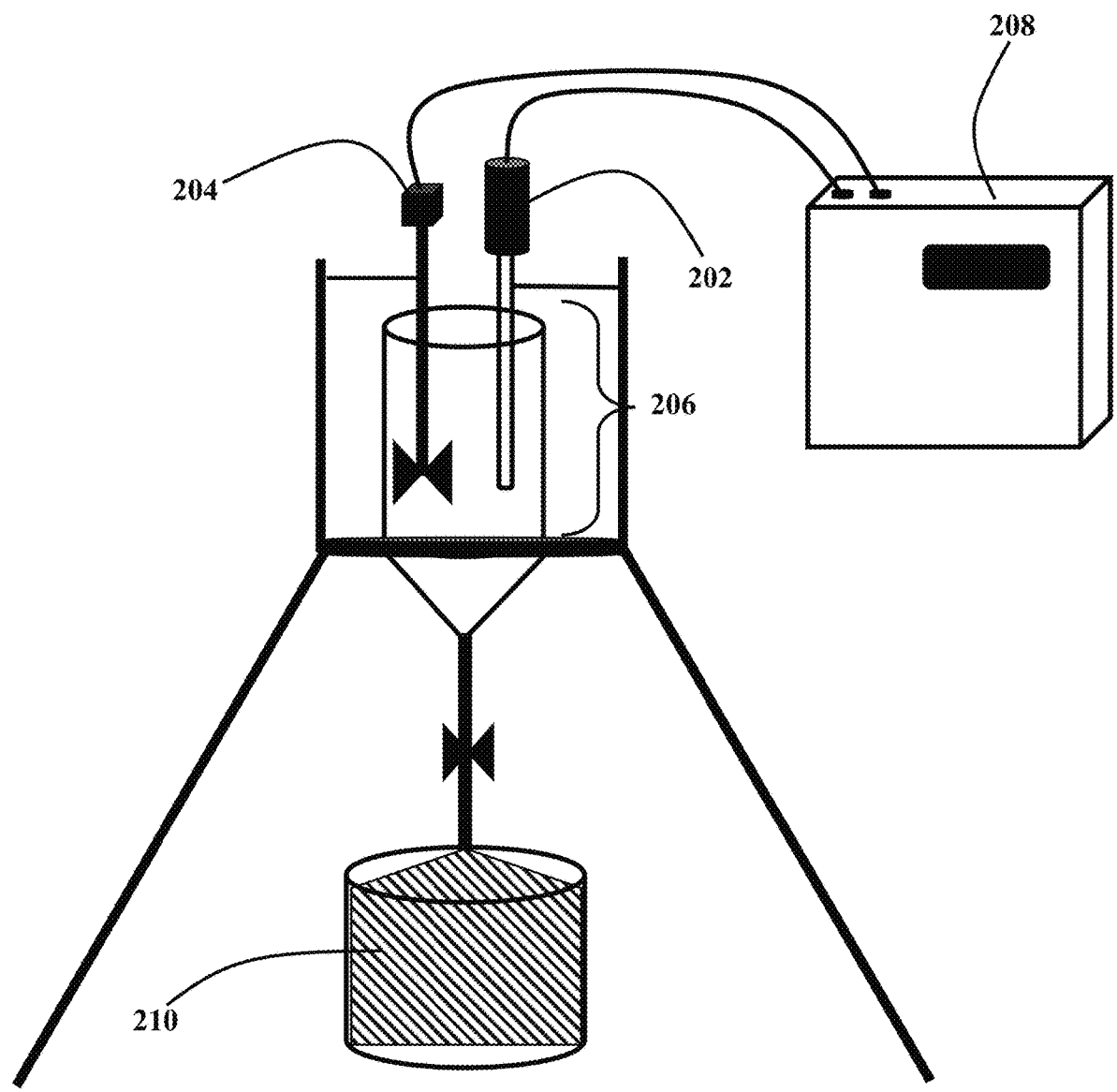
FIG. 2 illustrates a schematic view of a reactor for producing boehmite, consistent with one or more exemplary embodiments of the present disclosure.

FIG. 2 illustrates a schematic view of a reactor 200 that may be utilized in synthesizing boehmite, consistent with one or more exemplary embodiments of the present disclosure. In an exemplary embodiment, reactor 200 may include a heating element 202, a mixer 204, a container 206, a controller 208, and a filter 210. In an exemplary embodiment, mixer 204 and heating element 202 may be placed inside container 206. Mixer 204 and heating element 202 may be connected to controller 208. Filter 210 may be connected to container 206 from a bottom end of container 206. Container 206 may include a polyethylene container.

Mixer 204 may include a mechanical mixer with rotating wings and a magnetic stirrer. As used herein, an exemplary magnetic stirrer may refer to a device that may employ a rotating magnetic field to stimulate a stir bar immersed in a liquid to rotate. In an exemplary embodiment, controller 208 may further be configured to adjust the temperature of heating element 202 and rotational speed of mixer 204. Controller 208 may receive a set point for temperature and a set point for a rotational speed and may keep heating element 202 and mixer 204 at those set points. In an exemplary embodiment, controller 208 may include a proportional integrated derivative (PID) controller.

In an exemplary embodiment, filter 210 may separate solids and liquids. In an exemplary embodiment, filter 210 may include a filter paper and a filter press. As used herein, an exemplary filter press may include a filter to separate solids and liquids utilizing pressurized air or vacuum air.

In an exemplary embodiment, step 102 of producing an exemplary sodium aluminate solution may be carried out in a stirred reactor, similar to reactor 200. In an exemplary embodiment, mixer 204 may rotate with a rotational speed between 100 rpm and 700 rpm for 10 to 60 minutes to dissolve sodium aluminate in water.

In an exemplary embodiment, step 104 of producing the aluminum hydroxide gel may include mixing an exemplary hydrochloric acid solution and an exemplary sodium aluminate solution in a stirred reactor, similar to reactor 200. In an exemplary embodiment, mixer 204 may rotate with a rotational speed between 100 rpm and 300 rpm for 30 to 90 minutes to mix an exemplary sodium aluminate solution with an exemplary hydrochloric acid solution.

In an exemplary embodiment, producing an exemplary aluminum hydroxide gel with a pH between 8.5 and 10.5 may include adding an exemplary hydrochloric acid solution with a concentration between 1 mol/L and 3 mol/L to an exemplary sodium aluminate solution with a volume ratio between 1:1 and 3:1 (hydrochloric acid solution:sodium aluminate solution).

After mixing an exemplary sodium aluminate solution and an exemplary hydrochloric acid solution in a stirred reactor, similar to reactor 200 for 30 to 90 minutes, an exemplary aging process may be performed. To perform an exemplary aging process, an exemplary aluminum hydroxide gel may be stirred utilizing mixer 204 with a rotational speed between 200 rpm and 700 rpm for 20 to 60 minutes and an exemplary aluminum hydroxide gel may be circulated within container 206 utilizing a pump. In an exemplary embodiment, an exemplary pump may create turbulence by pumping out an exemplary aluminum hydroxide gel through a line and then injecting an exemplary aluminum hydroxide gel back into container 206 through another line. Creating turbulence in an exemplary aluminum hydroxide gel may decrease agglomeration of aluminum hydroxide particles.

In an exemplary embodiment, an exemplary aluminum hydroxide gel may include three phases, namely, bayerite, gibbsite, and nordstrandite. In an exemplary embodiment, aging process may lead to the nordstrandite phase to be the dominant phase of an exemplary aluminum hydroxide gel. The dominate-nordstrandite phase may enhance solubility of an exemplary aluminum hydroxide gel. An exemplary aluminum hydroxide gel may be washed with water with a weight ratio between 1:1 and 1:3 (aluminum hydroxide gel:water). An exemplary aluminum hydroxide gel and water may be mixed in a stirred reactor, similar to reactor 200 by mixer 204 with a rotational speed of between 200 rpm and 700 rpm for 1 to 2 hours.

In an exemplary embodiment, step 104 may further involve heating an exemplary aluminum hydroxide gel. In an exemplary embodiment, heating an exemplary aluminum hydroxide gel may include heating the exemplary aluminum hydroxide gel utilizing a heating element, similar to heating element 202. In an exemplary embodiment, heating element 202 may be a metallic-resistance-heating element configured to heat an exemplary aluminum hydroxide gel at a temperature between 50° C. and 95° C. In an exemplary embodiment, water may be used to dissolve NaCl that may be a byproduct in an exemplary reaction between sodium aluminate and an exemplary hydrochloric acid solution. An exemplary aluminum hydroxide gel may be filtered utilizing filter 210 to separate an exemplary aluminum hydroxide gel from the aqueous phase containing NaCl and water. An exemplary filter may be a filter press or a vacuum filter.

In an exemplary embodiment, step 106 of producing the aluminum chloride solution may include mixing an exemplary hydrochloric acid solution and an exemplary aluminum hydroxide gel in a stirred reactor, similar to reactor 200. An exemplary hydrochloric acid solution and an exemplary aluminum hydroxide gel may be mixed by mixer 204 with a rotational speed of between 100 rpm and 500 rpm for 30 to 90 minutes.

In an exemplary embodiment, step 106 may further involve heating an exemplary hydrochloric acid solution and an exemplary aluminum hydroxide gel. In an exemplary embodiment, heating an exemplary hydrochloric acid solution and an exemplary aluminum hydroxide gel may include heating an exemplary hydrochloric acid solution and an exemplary aluminum hydroxide gel utilizing a heating element, similar to heating element 202. In an exemplary embodiment, heating element 202 may be a metallic-resistance-heating element configured to heat an exemplary hydrochloric acid solution and an exemplary aluminum hydroxide gel at a temperature between 20° C. and 50° C. To produce an exemplary aluminum chloride solution with a pH less than 3, an exemplary hydrochloric acid solution with a concentration between 2 mol/L and 6 mol/L may be added to an exemplary aluminum hydroxide gel with a volume ratio between 1:1 and 1:3 (aluminum hydroxide gel:hydrochloric acid solution).

In an exemplary embodiment, step 108 of producing the saturated aluminum chloride solution may include heating an exemplary aluminum chloride solution in a stirred reactor, similar to reactor 200. An exemplary aluminum chloride solution may be heated utilizing heating element 202 at between 50° C. and 95° C. for between 1 hour and 2 hours. After heating an exemplary aluminum chloride solution, the exemplary aluminum chloride solution may include saturated and super saturated aluminum chloride solution. In an exemplary embodiment, an exemplary saturated aluminum chloride solution may include a concentration between 450 g aluminum chloride in 1 L water to 470 g aluminum chloride in 1 L water. In an exemplary embodiment, an exemplary super saturated aluminum chloride solution may include a concentration between 475 g aluminum chloride in 1 L water to 500 g aluminum chloride in 1 L water.

In an exemplary embodiment, step 110 of producing the boehmite gel may include mixing an exemplary ammonia solution and an exemplary saturated aluminum chloride solution in a stirred reactor, similar to reactor 200. An exemplary ammonia solution may be added to an exemplary saturated aluminum chloride solution during a time period between 30 minutes and 60 minutes. In an exemplary embodiment, an exemplary ammonia solution may be added to an exemplary saturated aluminum chloride solution with a weight ratio between 2:1 and 4:1 (ammonia solution: saturated aluminum chloride solution) when mixer 204 may rotate with a rotational speed of between 300 rpm and 700 rpm. An exemplary ammonia solution may include a concentration of between 13 g ammonia to 25 g ammonia in 100 mL water. In an exemplary embodiment, an exemplary ammonia solution and an exemplary saturated aluminum chloride solution may include a pH value between 9 and 11. An exemplary boehmite gel produced by mixing an exemplary ammonia solution and an exemplary saturated aluminum chloride solution may be separated from an aqueous solution utilizing filter 210. An exemplary aqueous solution may include an exemplary ammonium chloride solution. An exemplary filtration of an exemplary boehmite gel may take 1 to 2 hours.

In an exemplary embodiment, step 110 of producing an exemplary boehmite gel may further include producing an exemplary ammonium chloride solution as a byproduct. An exemplary aqueous phase may include an ammonium chloride salt and water with a concentration between 2.5 g/L and 3 g/L. An exemplary ammonium chloride solution may be heated at 80° C. and 100° C. for between 2 hours and 5 hours to separate an exemplary ammonium chloride salt from water. An exemplary ammonium chloride salt may include a purity between 80 wt. % and 99 wt. %.

In an exemplary embodiment, step 112 of heating an exemplary boehmite gel may include heating the exemplary boehmite gel in a heating chamber, such as an oven. An exemplary boehmite gel may be heated at 140° C. to 220° C. for 4 to 6 hours. An exemplary boehmite gel may convert to boehmite after an exemplary heating process.

In an exemplary embodiment, step 112 of heating an exemplary boehmite gel may further include grinding boehmite in a mill, such as a blade mill or a ball mill for 10 to 30 minutes after an exemplary heating process. As used herein, a mill may refer to a device to grind particles by a crushing mechanism or a cutting mechanism. In an exemplary embodiment, an exemplary blade mill may include a container and rotating blades, which may cut particles into small pieces. In an exemplary embodiment, an exemplary ball mill may include a container and multiple balls disposed in an exemplary container which may grind particles by a crushing mechanism. In an exemplary embodiment, an exemplary mill or exemplary rotating blades may rotate with a rotational speed of between 500 rpm and 3000 rpm. After an exemplary grinding process, boehmite may include particles of boehmite in which an average size of particles may be in a range of 5 μm and 50 μm. Exemplary particles of boehmite may be an agglomeration of nanoparticles with an average particle size between 50 nm and 100 nm. An exemplary produced boehmite may include chemical purity and phase purity between 95 wt. %-99 wt. % and 93 wt. %-99 wt. % respectively. An exemplary produced boehmite by method 100 may include porosity and specific surface area between 0.4 cm$^3$/g-0.64 cm$^3$/g and 170 m$^2$/g-270 m$^2$/g, respectively.

Example 1: Producing Boehmite (Sample 1)

Figure 3:
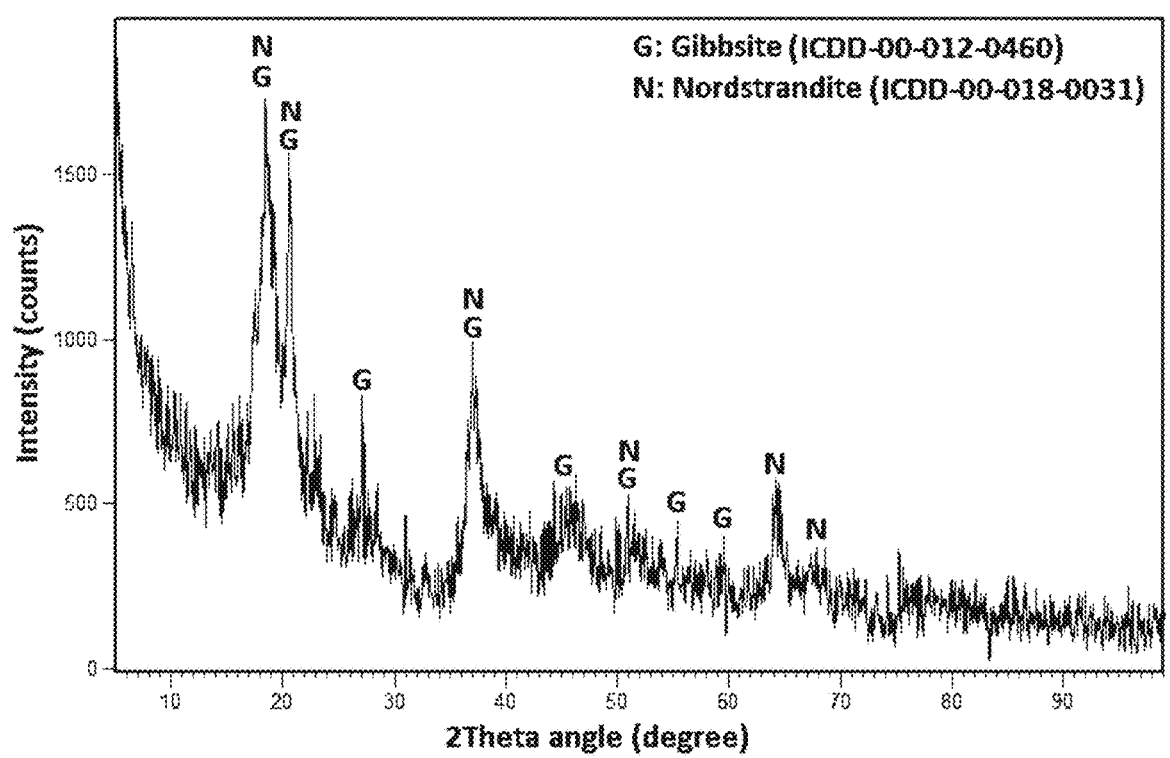
FIG. 3 illustrates an X-ray diffraction (XRD) pattern of an exemplary aluminum hydroxide gel, consistent with one or more exemplary embodiments of the present disclosure.
Figure 4:
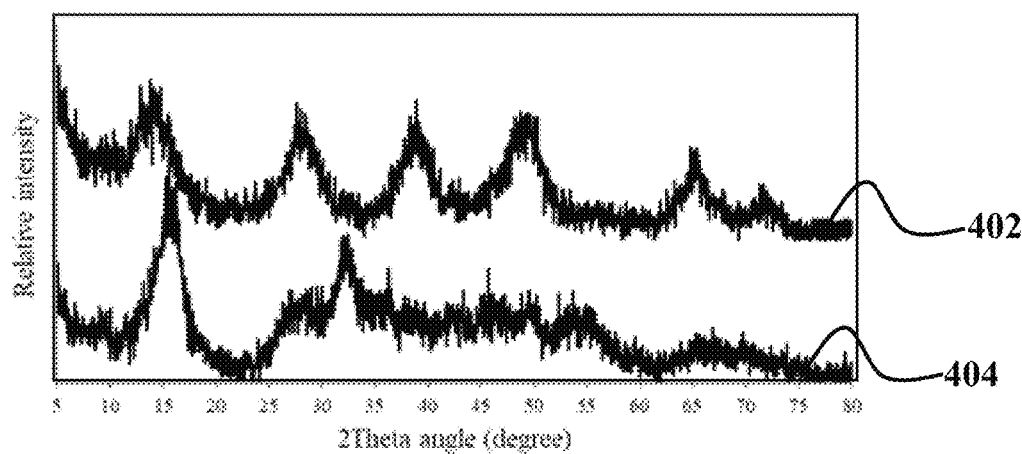
FIG. 4 illustrates XRD patterns of boehmite dried at 140° C. and 220° C., consistent with one or more exemplary embodiments of the present disclosure.

Boehmite may be produced by a chemical method similar to method 100. To produce a sodium aluminate solution, 600 g of sodium aluminate salt with the purity between 80 wt. % and 99 wt. % may be dissolved in 3000 mL distilled water at room temperature. An exemplary reaction between sodium aluminate salt and water may increase the temperature by 10° C. to 20° C. When an exemplary sodium aluminate solution may reach room temperature, a hydrochloric acid solution with the concentration between 1 mol/L and 3 mol/L may be added to the exemplary sodium aluminate solution to adjust the pH at 9.5. An aluminum hydroxide gel may be produced after mixing an exemplary hydrochloric acid solution and an exemplary sodium aluminate solution. Gibbsite and bayerite phases of an aluminum hydroxide gel may be produced in this step. An exemplary aluminum hydroxide gel may be washed utilizing distilled water at 85° C. to remove soluble salts, such as NaCl. XRD diffraction pattern 300 of an exemplary aluminum hydroxide gel is shown in FIG. 3. Peaks of gibbsite and nordstrandite phases of aluminum hydroxide gel are shown in FIG. 3. 3 mol/L of a hydrochloric acid solution may be added to an exemplary aluminum hydroxide gel to produce aluminum chloride and adjust a pH between 2 and 3. An exemplary aluminum chloride solution may be heated at 95° C. to produce a saturated aluminum chloride solution. An ammonia solution 25% may be added to an exemplary saturated aluminum chloride solution for a time period of 30 minutes to adjust a pH at 7. An exemplary saturated aluminum chloride and an exemplary ammonia solution may be mixed by a mixer with a rotational speed of between 150 rpm and 500 rpm to produce a boehmite gel. An exemplary boehmite gel may be mixed for 30 minutes. After 30 minutes of mixing, an exemplary boehmite gel may be filtered and may be separated from aqueous phase. After filtration, an exemplary boehmite gel may be washed utilizing distilled water at 85° C. An exemplary boehmite gel may be filtered again to eliminate the aqueous phase. An exemplary boehmite gel may be dried in a hot chamber, such as oven at a temperature between 140° C. and 220° C. for 4 hours to produce boehmite. An exemplary aqueous phase may include an aluminum chloride salt. An exemplary aluminum chloride salt may be separated from an aluminum chloride solution by evaporating water. An exemplary boehmite may be grinded for 20 minutes to produce a boehmite powder. XRD patterns 400 of boehmite are shown in FIG. 4 after drying at 140° C. and 220° C. XRD pattern 404 of boehmite dried at 140° C. and XRD pattern 402 of boehmite dried at 220° C. show consistency with standard peaks of ICDD-01-083-1506 and ICDD-00-021-1307, respectively. XRD patterns 400 show that increasing the temperature may improve crystallinity of an exemplary boehmite.

Purity of an exemplary boehmite was examined by X-ray fluorescence and the data are shown in Table 1. As shown in Table 1, boehmite may have a purity more than 99 wt. %. The presence of sodium and iron impurity is very negligible. Therefore, an exemplary boehmite may be applicable for a catalytic usage.

TABLE 1

| Oxide | $Al_2O_3$ | $Na_2O$ | $SiO_2$ | $SO_3$ | CaO | $Fe_2O_3$ | Cu |
|---|---|---|---|---|---|---|---|
| Wt. % | 99.903 | 0.057 | Trace | Trace | Trace | 0.04 | Trace |

Figure 5:
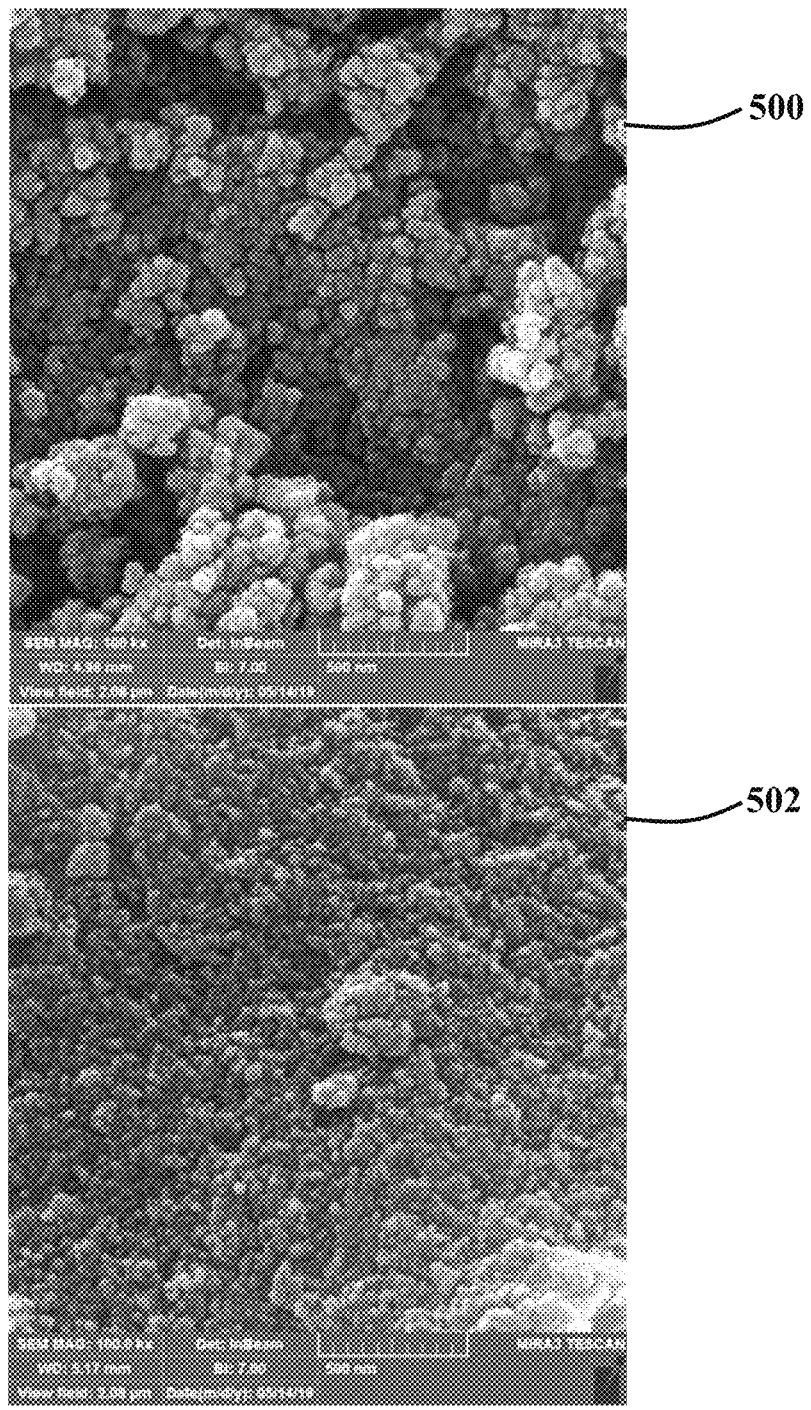
FIG. 5 illustrates field emission scanning electron microscopy (FE-SEM) images of boehmite dried at 140° C. and 220° C., consistent with one or more exemplary embodiments of the present disclosure.
Figure 6:
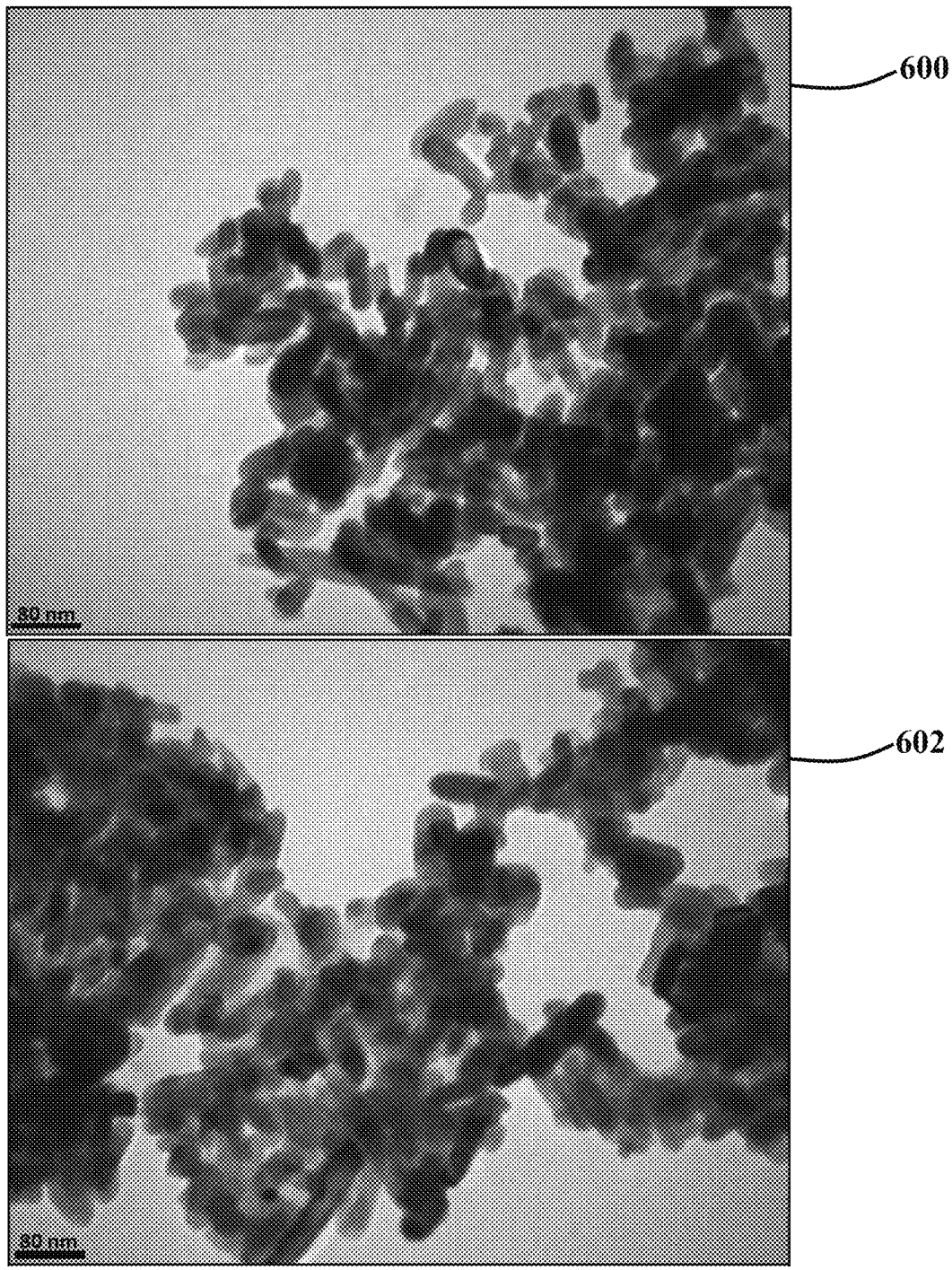
FIG. 6 illustrates transmission electron microscopy (TEM) images of boehmite dried at 140° C. and 220° C., consistent with one or more exemplary embodiments of the present disclosure.

FIG. 5 illustrates FE-SEM images of boehmite dried at 140° C. to 220° C., consistent with one or more exemplary embodiments of the present disclosure. Exemplary FE-SEM images 500 and 502 may show agglomeration of particles in the scale of nanometer in boehmite dried at 140° C. to 220° C., respectively. FIG. 6 illustrates TEM images of boehmite dried at 140° C. to 220° C. Exemplary TEM images 600 and 602 may show rice-shaped boehmite nanoparticles dried at 140° C. and 220° C., respectively. Exemplary nanoparticles may have a width of less than 40 nm and a length of less than 100 nm.

Figure 7:
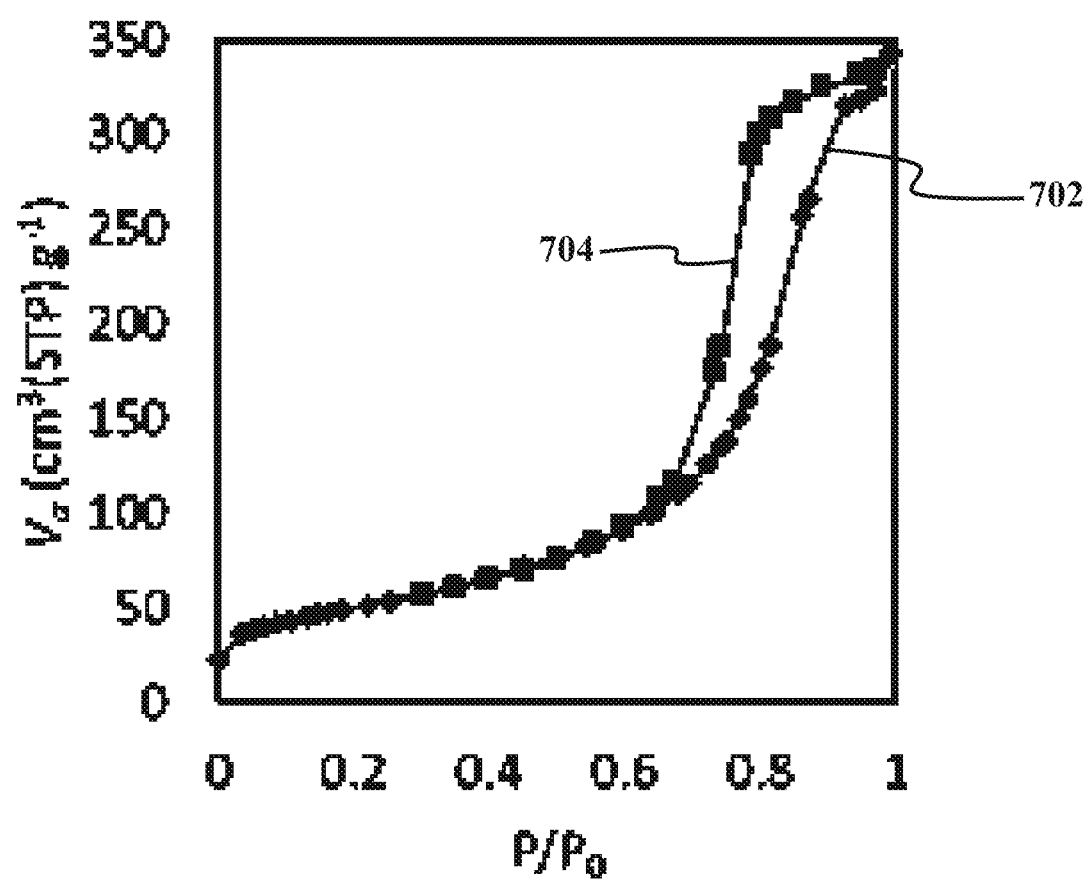
FIG. 7 illustrates nitrogen adsorption-desorption isotherms at 77 K for dried boehmite, consistent with one or more exemplary embodiments of the present disclosure.

FIG. 7 illustrates nitrogen adsorption-desorption isotherms at 77 K for boehmite dried at 220° C., consistent with one or more exemplary embodiments of the present disclosure. According to classifications of IUPAC, isotherms 700 may be type IV isotherms, in which capillary condensation may occur inside the pores of boehmite. Exemplary isotherms may be found in mesoporous materials. Isotherm images of 702 and 704 show adsorption and desorption isotherm of boehmite, respectively.

Figure 8:
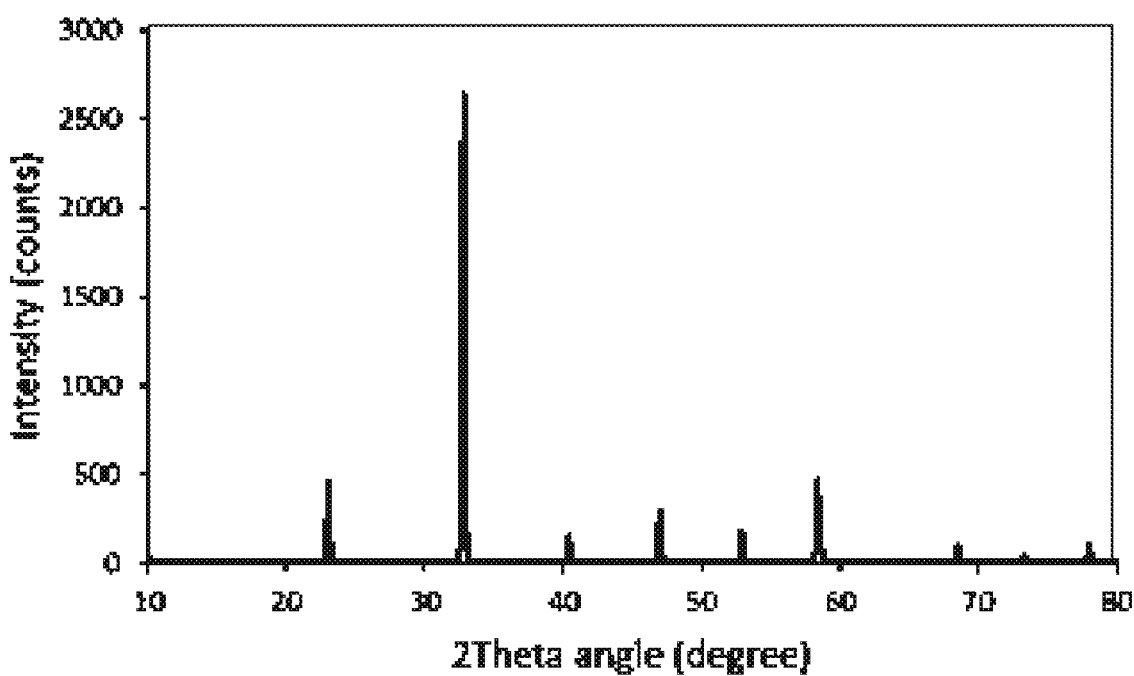
FIG. 8 illustrates an XRD pattern of ammonium chloride, consistent with one or more exemplary embodiments of the present disclosure.

FIG. 8 illustrates an XRD pattern of an exemplary ammonium chloride salt, consistent with one or more exemplary embodiments of the present disclosure. XRD pattern 800 of an exemplary ammonium chloride salt may show no peak for impurities. XRD pattern 800 of an exemplary ammonium chloride salt shown in FIG. 8 may have consistency with standard peaks of ICDD-01-073-1491.

Figure 9:
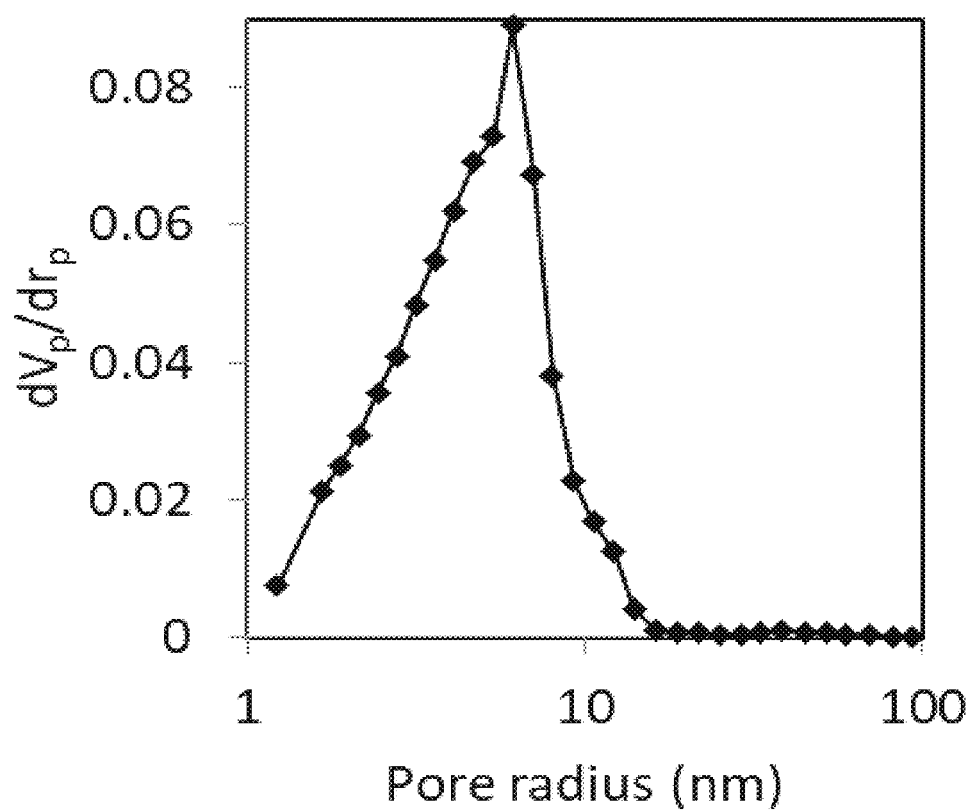
FIG. 9 illustrates a pore-size-distribution curve of boehmite, consistent with one or more exemplary embodiments of the present disclosure.

FIG. 9 illustrates a pore-size-distribution curve of boehmite, consistent with one or more exemplary embodiments of the present disclosure. Pore size distribution curve 900 may show mono dispersion of boehmite pores.

Example 2: Producing Boehmite (Sample 2)

Figure 10:
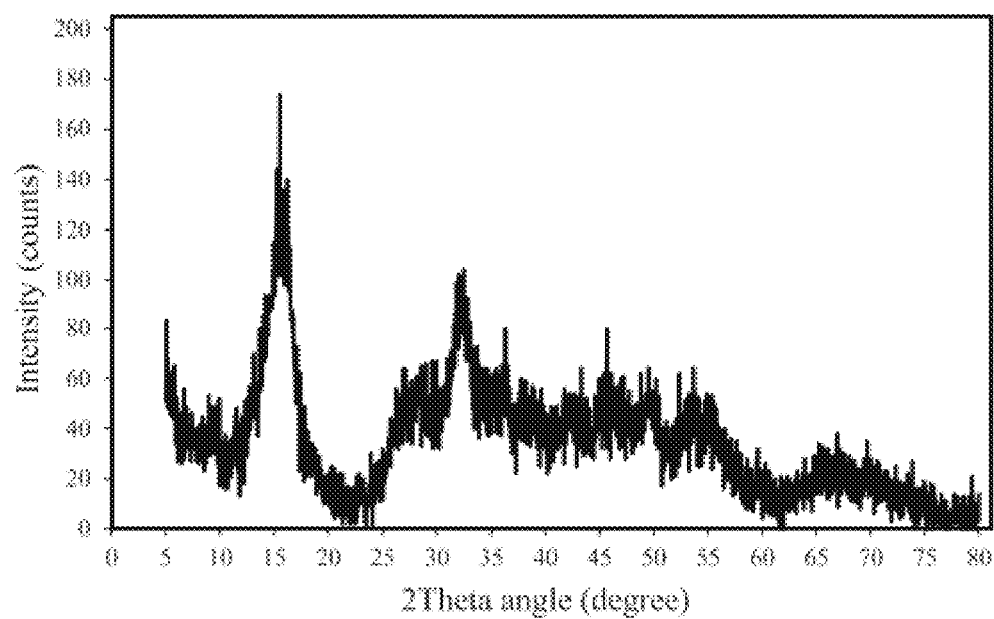
FIG. 10 illustrates an XRD pattern of a sample produced by a sodium bicarbonate solution instead of an ammonia solution, consistent with one or more exemplary embodiments of the present disclosure.
Figure 11:
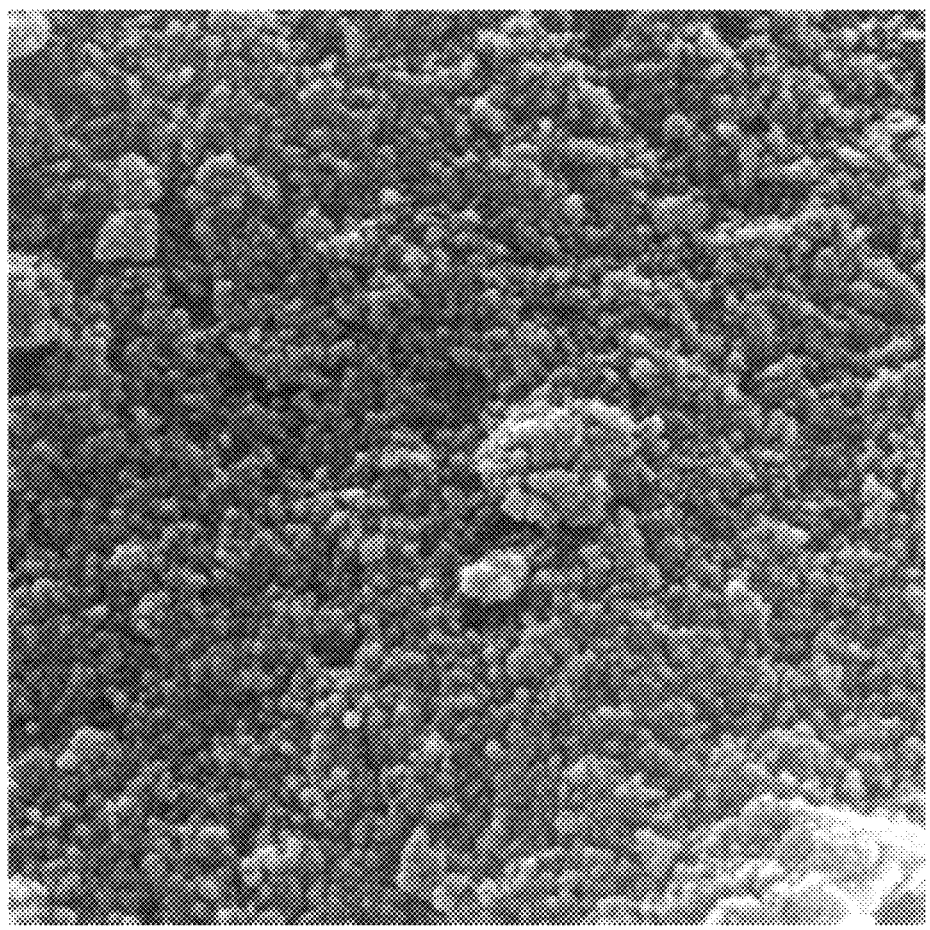
FIG. 11 illustrates an FE-SEM image of a sample produced by a sodium bicarbonate solution instead of an ammonia solution, consistent with one or more exemplary embodiments of the present disclosure.

Boehmite may be produced by a chemical method similar to method 100, however with the addition of a sodium bicarbonate solution instead of an ammonia solution for 1 hour to reach a pH between 9 and 12. An XRD pattern of sample 2 is shown in FIG. 10. XRD pattern 1000 may match with standard ICDD-01-083-1506 card for boehmite. FIG. 11 shows a FE-SEM image of sample 2. Agglomeration of boehmite nanoparticles is shown in FE-SEM image 1100.

Example 3: Producing Boehmite (Sample 3)

Boehmite may be produced by a chemical method similar to method 100 but the only difference may be the addition of an ammonium chloride solution to an exemplary sodium aluminate solution for 20 minutes.

Example 4: Producing Boehmite (Sample 4)

Boehmite may be produced by a chemical method similar to method 100 but the only difference may be the addition of an ammonium nitrate solution to an exemplary sodium aluminate solution for 20 minutes.

Example 5: Producing Boehmite (Sample 5)

Boehmite may be produced by a chemical method similar to method 100 but the only difference may be the addition of a poly aluminum chloride solution to an exemplary sodium aluminate solution for 40 minutes.

Example 6: Producing Boehmite (Sample 6)

Boehmite may be produced by a chemical method similar to method 100 but the only difference may be the addition of a sulfuric acid solution 3 mol/L to an exemplary aluminum hydroxide gel.

Example 7: Producing Boehmite (Sample 7)

Boehmite may be produced by a chemical method similar to method 100 but the only difference may be the addition of a nitric acid solution 3 mol/L to an exemplary aluminum hydroxide gel.

Example 8: Producing Boehmite (Sample 8)

Boehmite may be produced by a chemical method similar to method 100 but the only difference may be the addition of a sodium hydroxide solution instead of an ammonia solution for 15 minutes to reach the pH between 9 and 12.

Example 9: Producing Boehmite (Sample 9)

Boehmite may be produced by a chemical method similar to method 100 but the only difference may be the addition of a potassium hydroxide solution instead of an ammonia solution for 15 minutes to reach a pH between 9 and 12.

Example 10: Producing Boehmite (Sample 10)

Boehmite may be produced by a chemical method similar to method 100 but the only difference may be the addition of a sodium aluminate solution instead of an ammonia solution for 40 minutes to reach a pH between 9 and 12.

Example 11: Producing Boehmite (Sample 11)

Boehmite may be produced by a chemical method similar to method 100 but an exemplary boehmite may be dried at 140° C.

Example 12: Producing Boehmite (Sample 12)

Boehmite may be produced by a chemical method similar to method 100 but an exemplary boehmite may be dried at 170° C. Specific surface areas, pore volumes, and average pore diameters of samples 1 to 12 are shown in Table 2.

TABLE 2

| sample | Specific surface area ($m^2/g$) | pore volume ($cm^3/g$) | average pore diameter (nm) |
| --- | --- | --- | --- |
| 1 | 177.4 | 0.53 | 11.9 |
| 2 | 181.6 | 0.56 | 10.6 |
| 3 | 168.9 | 0.48 | 9.5 |
| 4 | 220.3 | 0.65 | 14.8 |
| 5 | 228.6 | 0.62 | 15.7 |
| 6 | 175.7 | 0.47 | 12.4 |
| 7 | 184.1 | 0.52 | 10.9 |
| 8 | 230.4 | 0.59 | 18.9 |
| 9 | 217.7 | 0.54 | 14.2 |
| 10 | 192.9 | 0.49 | 16.1 |
| 11 | 174.5 | 0.43 | 12.8 |
| 12 | 186.6 | 0.58 | 11.3 |

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for producing boehmite under atmospheric pressure,
the method comprising:
producing a sodium aluminate solution by dissolving sodium aluminate in water, wherein a concentration of the sodium aluminate solution is between 1 mol/L and 5 mol/L;
producing an aluminum hydroxide gel by mixing a hydrochloric acid solution with the sodium aluminate solution, wherein a volume ratio of the hydrochloric acid solution and the sodium aluminate solution is between 1:1 and 3:1 (the hydrochloric acid solution: the sodium aluminate solution);
producing an aluminum chloride solution by mixing a hydrochloric acid solution with the aluminum hydroxide gel with a volume ratio between 1:1 and 3:1 (the hydrochloric acid solution:the aluminum hydroxide gel);
producing a saturated aluminum chloride solution by heating the aluminum chloride solution at a temperature between 50° C. and 95° C.;
producing a boehmite gel by mixing an ammonia solution with the saturated aluminum chloride solution with a weight ratio between 2:1 and 4:1 (the ammonia solution:the saturated aluminum chloride solution); and
heating the boehmite gel at a temperature between 140° C. and 220° C.

2. A method for producing boehmite under atmospheric pressure, the method comprising:
producing a sodium aluminate solution by dissolving sodium aluminate in water;
producing an aluminum hydroxide gel by mixing a hydrochloric acid solution with the sodium aluminate solution;
producing an aluminum chloride solution by mixing a hydrochloric acid solution with the aluminum hydroxide gel;
producing a saturated aluminum chloride solution by heating the aluminum chloride solution;
producing a boehmite gel by mixing an ammonia solution with the saturated aluminum chloride solution; and
heating the boehmite gel.

3. The method of claim 2, wherein producing the sodium aluminate solution comprises dissolving sodium aluminate in water, wherein a concentration of the sodium aluminate solution is between 1 mol/L and 5 mol/L.

4. The method of claim 3, wherein producing the sodium aluminate solution comprises mixing sodium aluminate with water in a reactor with a stirring rate of 100 rpm and 700 rpm for 10 to 60 minutes.

5. The method of claim 4, wherein producing the aluminum hydroxide gel comprises adding the hydrochloric acid solution to the sodium aluminate solution, wherein a volume ratio of the hydrochloric acid solution and the sodium aluminate solution is between 1:1 and 3:1 (the hydrochloric acid solution:the sodium aluminate solution).

6. The method of claim 5, wherein producing the aluminum hydroxide gel further comprises adjusting pH of the hydrochloric acid solution and the sodium aluminate solution at a pH of between 8.5 and 10.5.

7. The method of claim 6, wherein producing the aluminum hydroxide gel further comprises adding the hydrochloric acid solution to the sodium aluminate solution with a concentration of the hydrochloric acid solution between 1 mol/L and 3 mol/L.

8. The method of claim 7, wherein producing the aluminum hydroxide gel comprises mixing the hydrochloric acid solution and the sodium aluminate solution in a reactor with a stirring rate of between 100 rpm and 300 rpm for 30 to 90 minutes.

9. The method of claim 8, wherein producing aluminum hydroxide gel further comprises mixing the aluminum hydroxide gel in a reactor with a stirring rate of between 200 and 700 rpm for 20 to 60 minutes.

10. The method of claim 2, wherein producing boehmite further comprises washing the aluminum hydroxide gel with water, wherein a weight ratio of the aluminum hydroxide gel and water is between 1:1 and 3:1 (the aluminum hydroxide gel:water).

11. The method of claim 10, wherein producing boehmite further comprises heating the aluminum hydroxide gel at a temperature between 50° C. and 95° C.

12. The method of claim 11, wherein washing the aluminum hydroxide gel comprises mixing the aluminum hydroxide gel with water with a stirring rate of between 200 rpm and 700 rpm for 1 to 2 hours.

13. The method of claim 12, wherein producing the aluminum chloride solution comprises mixing the hydrochloric acid solution and the aluminum hydroxide gel with a volume ratio between 1:1 and 3:1 (the hydrochloric acid solution: the aluminum hydroxide gel).

14. The method of claim 13, wherein producing the aluminum chloride solution further comprises adjusting pH of the hydrochloric acid solution and the aluminum hydroxide gel at a pH less than 3.

15. The method of claim 14, wherein producing the aluminum chloride solution comprises adding the hydrochloric acid solution to the aluminum hydroxide gel with a concentration of the hydrochloric acid solution between 2 mol/L and 6 mol/L.

16. The method of claim 15, wherein producing the aluminum chloride solution comprises mixing the hydrochloric acid solution and the aluminum hydroxide gel in a reactor with a stirring rate between 100 rpm and 500 rpm and for 30 to 90 minutes.

17. The method of claim 2, wherein producing the saturated aluminum chloride solution by heating the aluminum chloride solution further comprises heating the aluminum chloride solution at a temperature between 50° C. and 95° C. for 1 to 2 hours.

18. The method of claim 17, wherein producing the boehmite gel by mixing the ammonia solution with the saturated aluminum chloride solution comprises adding the ammonia solution to the saturated aluminum chloride solution with a weight ratio between 2:1 and 4:1 (the ammonia solution:the saturated aluminum chloride solution).

19. The method of claim 18, wherein producing the boehmite gel by mixing the ammonia solution with the saturated aluminum chloride solution further comprises adjusting pH of the ammonia solution and the saturated aluminum chloride solution at a pH between 9 and 11.

20. The method of claim 19, wherein producing the boehmite gel by mixing the ammonia solution with the saturated aluminum chloride solution further comprises heating the ammonia solution and the saturated aluminum chloride solution at a temperature between 50° C. and 95° C.

\* \* \* \* \*